United States Patent [19]

Jones

[11] Patent Number: 5,727,828
[45] Date of Patent: Mar. 17, 1998

[54] ADJUSTABLE GARDEN TOOL APPARATUS

[76] Inventor: Richard Jones, 2708 St. Anthony St., New Orleans, La. 70119

[21] Appl. No.: 774,481

[22] Filed: Dec. 30, 1996

[51] Int. Cl.$^6$ ........................................ A01B 1/18
[52] U.S. Cl. .................. 294/50.8; 294/51; 294/59; 294/118
[58] Field of Search ............... 294/49, 50.5–50.9, 294/51, 52, 59, 118; 756/400.04, 400.12; 172/372–376; 111/7.2, 101, 106, 108, 7.1

[56] References Cited

U.S. PATENT DOCUMENTS

| | | | |
|---|---|---|---|
| 909,289 | 1/1909 | Grisell et al. | 294/50.9 X |
| 1,588,927 | 6/1926 | Willis | 294/50.8 |
| 1,762,486 | 6/1930 | Roden | 294/118 |
| 2,217,109 | 10/1940 | Gillmor | 294/50.5 X |
| 2,422,929 | 6/1947 | Roller | 294/50.8 |
| 2,638,713 | 5/1953 | Edwards . | |
| 3,091,197 | 5/1963 | Henry | 294/49 X |
| 3,221,485 | 12/1965 | Jenkins | 294/52 X |
| 3,688,484 | 9/1972 | Cox | 56/400.12 |
| 4,057,277 | 11/1977 | Burkholder | 294/50.8 |
| 4,572,566 | 2/1986 | Terrington | 294/118 |
| 5,114,199 | 5/1992 | Newcomer | 294/50.8 |

FOREIGN PATENT DOCUMENTS

| | | | |
|---|---|---|---|
| 2539949 | 8/1984 | France | 294/50.8 |
| 436814 | 11/1967 | Switzerland | 294/50.8 |
| 777264 | 6/1957 | United Kingdom | 294/50.8 |

Primary Examiner—Johnny D. Cherry
Attorney, Agent, or Firm—Henderson & Sturm

[57] ABSTRACT

An adjustable garden tool apparatus having a pair of independently adjustable telescoping handle members 20 which are selectively and pivotally connected to one another at a variety of locations 27. At least one of the handle members 20 is provided with a fluid delivery system 60 and the bottoms of the handle members 20 are adapted to receive a plurality of diverse tool head elements 80.

3 Claims, 4 Drawing Sheets

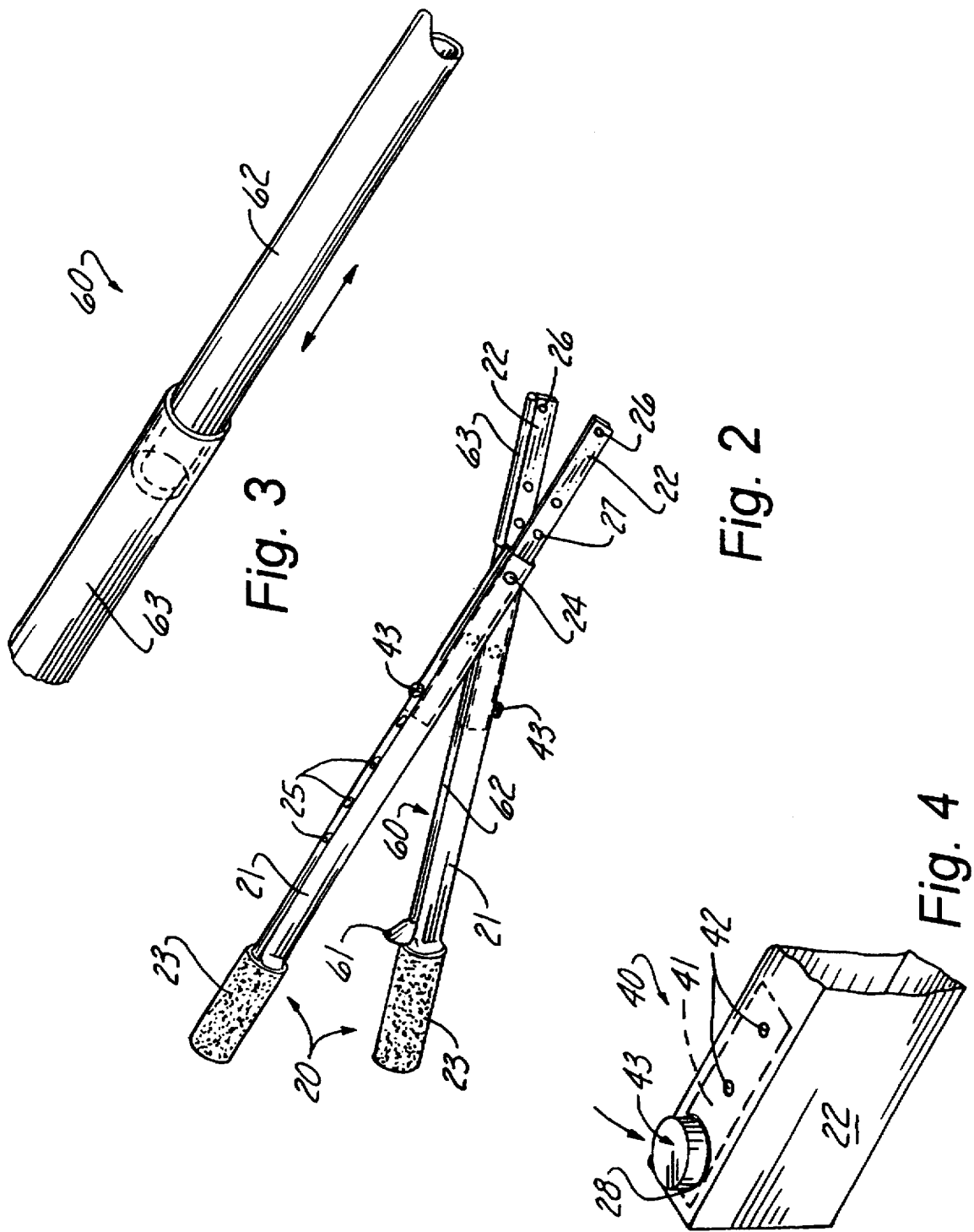

ADJUSTABLE GARDEN TOOL APPARATUS

STATEMENT REGARDING FEDERALLY SPONSORED RESEARCH OR DEVELOPMENT

Not applicable.

CROSS REFERENCE TO RELATED APPLICATIONS

Not applicable.

REFERENCE TO MICROFICHE APPENDIX

Not applicable.

BACKGROUND OF THE INVENTION

1. Field of the Invention

The present invention relates to the field of garden tools in general, and in particular to an adjustable length garden tool having interchangeable heads and a fluid dispensing function.

2. Description of Related Art

As can be seen by reference to the following U.S. Pat. Nos. 2,422,929; 2,638,713; 3,688,484; and 4,057,277; the prior art is replete with myriad and diverse dual handled garden tools, including at least one patent Burkholder '277 which teaches attaching diverse tools to the ends of the interconnected handles.

While all of the aforementioned prior art constructions are more than adequate for the basic purpose and function for which they have been specifically designed, they are uniformly remiss in a number of salient regards.

To begin with, none of the above cited prior art patents even remotely suggest varying the effective length of one or more of the dual handles employed in their respective arrangements, nor do they contemplate varying the pivoted connection between the handle members to change the leverage applied by the handle members.

In addition, none of the prior references provide any type of fluid delivery system in conjunction with a long handled garden implement for the purposes of irrigation, fertilization or weed control.

As a consequence of the foregoing situation, there has existed a longstanding need among gardeners for a new type of dual handled interchangeable tool head apparatus wherein the effective length of each of the handles, as well as the pivoted connection between the handles can be varied, and the provision of such a construction is a stated objective of the present invention.

BRIEF SUMMARY OF THE INVENTION

Briefly stated, the adjustable garden tool apparatus that forms the basis of the present invention comprises a pair of elongated telescoping adjustable length handle members which are pivotally secured to one another at a variety of locations along their respective lengths.

In addition, the bottoms of each of the handle members are adapted to releasably receive a variety of diverse tool head elements which may be employed in conjunction with the apparatus.

As will be explained in greater detail further on in the specification, this invention also contemplates the incorporation of a fluid delivery system into at least one of the elongated handle members such that fertilizer, water, herbicides or insecticides can be introduced through the garden tool apparatus.

Furthermore, this invention employs a variety of quick release detent mechanisms which govern not only the effective length of each of the handle members, but also the connection and disengagement of a variety of different garden tool head elements with the lower ends of each of the handle members.

BRIEF DESCRIPTION OF THE SEVERAL VIEWS OF THE DRAWING

These and other attributes of the invention will become more clear upon a thorough study of the following description of the best mode for carrying out the invention, particularly when reviewed in conjunction with the drawings, wherein:

FIG. 2 is an isolated detail view of the upper portions of the pivoted handle arrangement of the apparatus;

FIG. 3 is an isolated detail view of the telescoping portion of the fluid delivery system of the apparatus;

FIG. 4 is an isolated detail view of the handle adjustment mechanism;

DETAILED DESCRIPTION OF THE INVENTION

Figure 1:
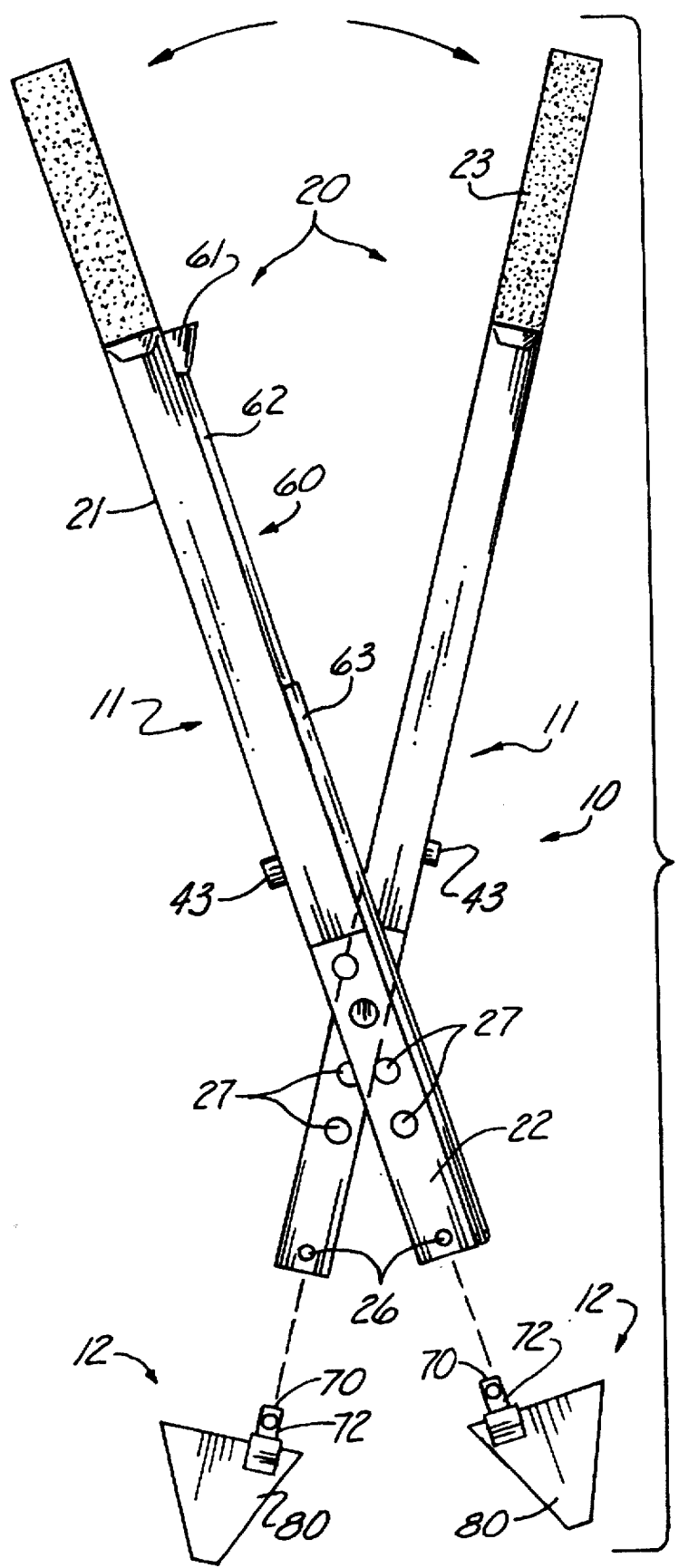
FIG. 1 is a perspective view of the adjustable garden tool apparatus that forms the basis of the present invention.

As can be seen by reference to the drawings, and in particularly to FIG. 1, the adjustable garden tool apparatus that forms the basis of the present invention is designated generally by the reference number 10.

The apparatus 10 comprises in general, a pair of adjustable length tool handle units 11 which are pivotally secured to one another and provided with a plurality of complimentary diverse pairs of tool head units 12. These units will now be described in seriatim fashion.

Figure 5:
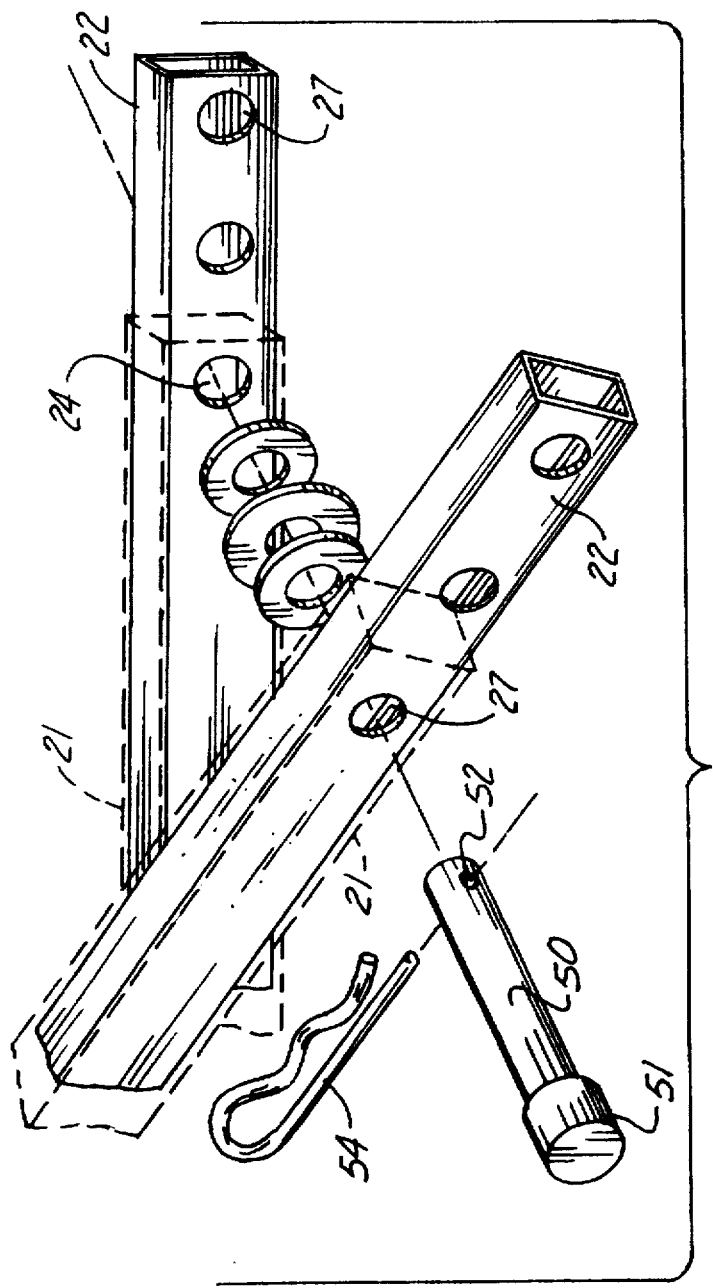
FIG. 5 is an exploded perspective view of the pivoted connection between the adjustable length handles.

As shown in FIGS. 1, 2, and 5, each of the adjustable length tool handle units 11 comprises an elongated telescoping handle member 20 including an upper hollow female portion 21 and a lower hollow male portion 22 which matingly engage one another in a well recognized fashion.

In addition, the outboard end of both female handle portions 21 is provided with a cushioned hand grip element 23. This inboard end is provided with a pair of aligned apertures 24 and the intermediate section is provided with a series of spaced apertures 25 whose purpose and function will be described in greater detail further on in the specification.

As shown in FIGS. 1, 2, 4, and 5, both of the male handle portions 22 are dimensioned to be slidably received within the female handle portions 21. The inboard ends of the male handle portions 22 are provided with a spring loaded detent mechanism 40, the outboard ends are provided with a discrete aperture 26 and the intermediate segment is provided with a plurality of spaced transverse apertures 27.

As can best be seen by reference to FIGS. 2, and 4, the detent mechanism 40 comprises a leaf spring member 41 attached to the interior of the hollow male handle portion 22 via securing means 42. The outboard end of the leaf spring 41 is provided with a detent element 43 which projects through a suitable dimensioned aperture 28 in the inboard ends of the male handle portions 22.

Furthermore, the detent element 43 is dimensioned to be received in a selected one of the spaced apertures 25 on the intermediate section of the female handle telescoping handle members 20 in a well recognized fashion.

Turning now to FIG. 5, it can be seen that each of the telescoping handle members 20 is pivotally secured to one another by an elongated pivot rod 50 dimensioned to be received in both the aligned apertures 24 on the inboard end of the female handle portion 21 and selected transverse apertures 27 on the intermediate segments of the male handle portions 22. The pivot rod 50 is provided with an enlarged head 51 on one end and a discrete aperture 52 on the other end dimensioned to receive a spring clip 54.

As shown in FIGS. 1 and 3, at least one of the handle members 20 is provided with a telescoping fluid delivery system designated generally by the reference numeral 60. The fluid delivery system 60 comprises in general a funnel element 61 operatively connected to a tubular male segment 62 operatively associated with the upper handle portion 21. The tubular male segment 62 is slideably received in a tubular female segment 63 which is operatively associated with the lower handle portion 22 such that fluid may be delivered along the length of one of the handle members 20.

Figure 6:
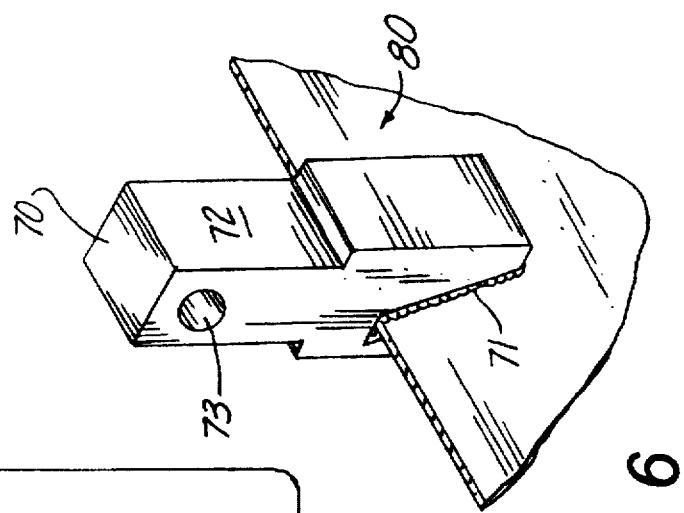
FIG. 6 is an isolated detail view of the attachment bracket that operatively engages the diverse tool heads to the apparatus.
Figure 7:
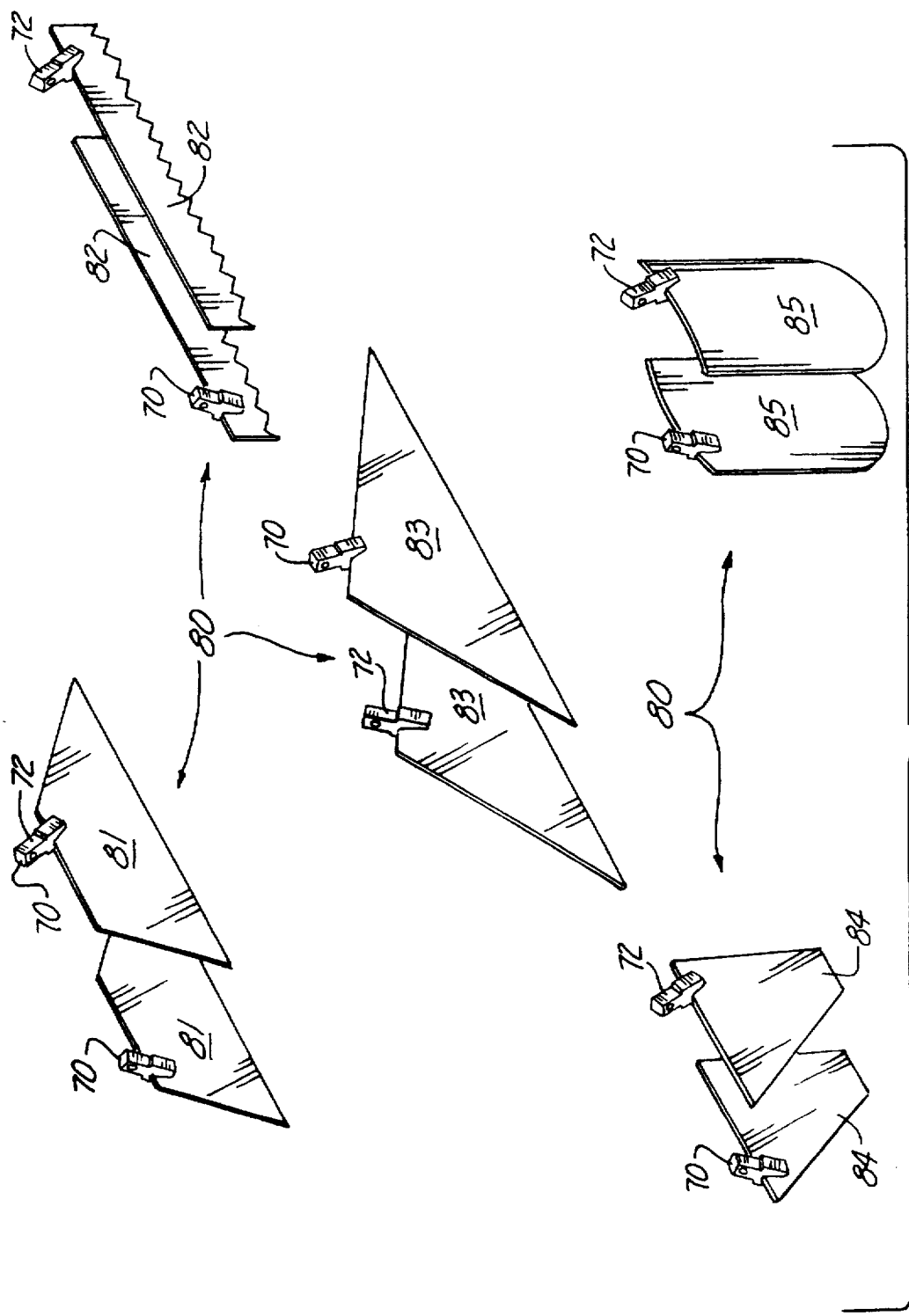
FIG. 7 is a perspective view of the diverse tool head pairs that may be employed in conjunction with the apparatus.

Turning now to FIGS. 1, 6, and 7, it can be seen that outboard ends of the lower handle portions 22 are dimensioned to receive a variety of tool head implements designated generally as 80. All of the tool head elements 80 are interchangeable and provided with an adapter element 70 which is designed to releasably engage the outboard end of each of the male handle portions 22.

Each of the adapter elements 70 is provided with a recess 71 which fixedly receives a portion of one of the tool head elements 80 wherein the upper portion of the adapter elements 70 is provided with a generally rectangular post 72 which is dimensioned to be received in the bottom of the handle members 20 and is further provided with a ball detent 73 which cooperates with the discrete apertures 26 in the male handle portions 22 to captively engage the selected tool head elements 80 in a well recognized fashion.

As shown in FIG. 7, the tool head elements 80 that are contemplated for use with the apparatus 10 of this invention include, but are not limited to pulling/mixing blades 81, claw/rake blades 82, angular blades 83, picking blades 84, shove/post-hole blades 85, etc.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. An adjustable handle garden tool apparatus consisting of:

a pair of elongated telescoping handle members pivotally secured to one another;

wherein one of said telescoping handle members is provided with a fluid delivery system, each of said telescoping handle members comprises an upper female portion and a lower male portion wherein said female portion and said male portion have outboard ends and mating inboard ends, the inboard end of the female portion has a pair of transverse apertures, and the inboard end of the male portion has a plurality of pairs of transverse apertures, wherein said transverse apertures are dimensioned to selectively receive a pivot pin for pivotally connecting said handle members together at different points on said lower male portion, wherein the female portion has a plurality of spaced apertures and said male portion has a spring biased detent element that is dimensioned to be received in said spaced apertures for varying the effective length of each of said handle members, wherein the lower end of said male portion is provided with a discrete aperture for releasably engaging a portion of said at least one pair of tool head elements, wherein said fluid delivery system includes: a funnel element; a tubular female segment; and a tubular male segment slideably received in said tubular female segment wherein one of said tubular segments is operatively associated with said female portion and the other tubular segment is operatively associated with said male portion; and at least one pair of tool head elements is operably and releasably associated with the bottom of said telescoping handle members.

2. The apparatus as in claim 1 further comprising:

a plurality of diverse pairs of tool head elements wherein the lower end of said male portion is provided with a discrete aperture for releasably engaging portions of said plurality of pairs of tool head elements.

3. The apparatus as in claim 2 wherein said plurality of diverse pairs of tool head elements includes picking blades, raking blades, pulling blades, angular blades, and shovel blades.

* * * * *